(12) United States Patent
Rivier

(10) Patent No.: US 7,214,396 B2
(45) Date of Patent: *May 8, 2007

(54) CONFECTIONERY PRODUCT CONTAINING FUNCTIONAL INGREDIENTS AND METHOD OF MAKING AND USING

(75) Inventor: Vincent Rivier, Piegano (IT)

(73) Assignee: Nestec S.A., Vevey (CH)

( * ) Notice: Subject to any disclaimer, the term of this patent is extended or adjusted under 35 U.S.C. 154(b) by 539 days.

This patent is subject to a terminal disclaimer.

(21) Appl. No.: 10/277,697

(22) Filed: Oct. 23, 2002

(65) Prior Publication Data

US 2003/0059501 A1    Mar. 27, 2003

Related U.S. Application Data

(63) Continuation of application No. PCT/EP01/03675, filed on Apr. 2, 2001.

(30) Foreign Application Priority Data

May 3, 2000    (EP) .................................. 00201596
Oct. 24, 2000    (EP) .................................. 00203678

(51) Int. Cl.
     *A23G 3/54*      (2006.01)

(52) U.S. Cl. ............................ 426/72; 426/73; 426/74; 426/138; 426/282; 426/660

(58) Field of Classification Search .................... 426/5, 426/295, 96, 138, 89, 514, 516, 413, 282, 426/512, 103, 77, 78, 518, 143, 72–74, 660; 99/494

See application file for complete search history.

(56) References Cited

U.S. PATENT DOCUMENTS

| | | | | |
|---|---|---|---|---|
| 3,620,759 | A | * 11/1971 | Maddox | ...................... 426/78 |
| 4,088,864 | A | * 5/1978 | Theeuwes et al. | ...... 219/121.71 |
| 4,293,570 | A | * 10/1981 | Vadasz | ........................... 426/3 |
| 4,452,821 | A | 6/1984 | Gergely | ......................... 426/5 |
| 4,513,012 | A | * 4/1985 | Carroll et al. | .................. 426/5 |
| 4,762,719 | A | * 8/1988 | Forester | ..................... 424/440 |
| 4,938,128 | A | * 7/1990 | Knebl | ....................... 99/450.6 |
| 4,992,420 | A | * 2/1991 | Neeser | .......................... 514/8 |
| 5,554,379 | A | 9/1996 | Cuca et al. | .................. 424/439 |
| 5,603,971 | A | * 2/1997 | Porzio et al. | ................. 426/96 |
| 5,670,163 | A | 9/1997 | Cuca et al. | .................. 424/439 |
| 5,858,391 | A | 1/1999 | Cuca et al. | .................. 424/439 |
| 6,090,430 | A | 7/2000 | Mochizuki et al. | ......... 426/572 |
| 6,117,477 | A | * 9/2000 | Paluch | ....................... 426/623 |

FOREIGN PATENT DOCUMENTS

| | | |
|---|---|---|
| EP | 0 310 801 A1 | 4/1989 |
| EP | 0 948 900 A1 | 10/1999 |
| JP | 11 046687 A2 | 2/1999 |
| JP | 11 279204 A2 | 10/1999 |
| WO | WO 98/47482 | 10/1998 |

OTHER PUBLICATIONS

Kirk-Othmer Encyclopedia of Chemical Technology. Third Edition, vol. 11. Wiley-Interscience. New York.1980, pp. 146-163.*
Kirk-Othmer Encyclopedia of Chemical Technology. Second Edition, vol. 21. Wiley-Interscience. New York.1970, pp. 484-485.*
Cosmetics Additives—An Industrial Guide. William Andrews Publishing. 1991, p. 401.*

* cited by examiner

*Primary Examiner*—Arthur L. Corbin
(74) *Attorney, Agent, or Firm*—Bell, Boyd & Lloyd LLP

(57) ABSTRACT

The invention relates to a confectionery product that includes at least one functional ingredient that has a casing and a filling enclosed within the casing. The filling includes at least one confectionery material having properties that confer to the filling a perceivable effect when the filling is released in the mouth. The casing is capable of releasing the filling when contacting saliva in the mouth. This liberates the filling out of the casing while allowing the casing to be left substantially as an empty shell before it entirely dissolves in the mouth.

33 Claims, 5 Drawing Sheets

CONFECTIONERY PRODUCT CONTAINING FUNCTIONAL INGREDIENTS AND METHOD OF MAKING AND USING

CROSS-REFERENCE TO RELATED APPLICATIONS

This application is a continuation of the U.S. national stage designation of International application PCT/EP01/03675 filed Apr. 2, 2001, the content of which is expressly incorporated herein by reference thereto.

BACKGROUND OF THE INVENTION

The present invention relates to a novel confectionery product capable of providing a pleasant and rapid release of a confectionery material to the consumer. More specifically, the invention relates to a confectionery product capable of delivering at least one functional ingredient in a pleasant and perceivable manner. The present invention also relates to a method for releasing functional ingredients from a confectionery product providing a perceived well-being effect which increases consumer acceptance.

A number of attempts have been made to encapsulate or retain functional ingredients into various glassy, sintered or chewy matrixes. In general, the confectionery serves as a solid continuous matrix for the functional ingredient. The functional ingredient is delivered according to the dissolution rate of the confectionery matrix which confers a solid taste in the mouth. Crushing the confectionery is a solution for the consumer to speed up the release of the functional ingredient but this solution may be undesirable as dental problems may arise and/or the release rate of the functional ingredient may not be respected as recommended. Depending upon the method of manufacturing the confectionery matrix, the functional ingredient may suffer from deterioration or damages due to heat and/or mechanical stresses in the manufacturing process. The method which consists in overdosing of the functional ingredients in the confectionery matrix to overcome a high deterioration rate due to strong processing conditions is a costly method. The "solid" taste a pressed tablet or glassy matrix may provide in the mouth may also be considered as not very attractive in the context of delivering active ingredients, especially if the product is supposed to be primarily a confectionery.

Liquid filled boiled sweets are known. They may also be used to deliver functional ingredients. However, despite the fact the center is primarily liquid, the whole product has a tendency to melt as one piece in the mouth while the center does not release from the casing rapidly but melts slowly and progressively thus making a pasty mass.

Powdered sugar filling in a high boiled sweet is also known for many years to make traditional confectioneries such as "Sherbet Lemon" in England. However, such a sweet has not been used for delivering functional ingredients. Furthermore, it behaves in the mouth in a way similar to the liquid filled boiled sweets with the casing and filling melting slowly in the mouth; a significant part of the filling agglomerating within the casing in contact with the saliva thus forming lumps which remain in the casing during the dissolution of the casing.

In the domain of the encapsulation of functional ingredients, the following publications are cited as pertaining to general background. U.S. Pat. No. 5,897,897 relates to encapsulation of medications, pesticides, vitamins, preservatives and flavoring agents within a glassy matrix consisting of modified starch and polyhydric alcohol. EP 09 04 784 discloses a probiotic preparation with health promoting action comprising bacteria cells, novelose, arabic gum included in a 3-gram proteinic capsule. U.S. Pat. No. 5,648,092 relates to pharmaceutical compositions in the form of pleasant-tasting chewable tablets or chewable coated tablets which besides the pharmaceutically active ingredient sulfacrate, essentially contain at least one rapidly swellable physiologically acceptable gel former plus sugar or sugar substitutes. U.S. Pat. No. 4,396,631 describes a bifidobacterium-containing confectionery tablet including one or more of substances selected from the group consisting of starch, starch hydrolysate and protein. JP 2893021 relates to a boiled sweet enclosing bifidobacteria encapsulated with a protective coating film and diluted with a mixture of powdered sugar or sugar alcohol as a filling. JP 60083535 relates to a preparation of candies containing lactobacilli activated with spores made by mixing sugar and millet honey, chilling, pulverising and adding activated lactobacilli powder. JP 57032221 discloses candy tablets containing bifidus microorganism made by mixing microorganism powder with fat, adding further raw materials and tabletting. EP 07 04 164 discloses a confectionery composition containing a long-life lactic bacteria, fats and/or oil, fermented milk powder and saccharide. DE 19830528 discloses a multi-layer tablet comprising nutritious substances and microorganisms and can be stored without cooling.

Confectionery technology, in particular sugar-based confectionery, also suffers from a negative image of providing very little positive effect on nutrition and health. In the meantime, in the recent well-being oriented boom, there is an increasing general concern and consciousness of people relating to food and what should be the true and genuine function of food with respect to health and nutrition. The known products on the market are far from reaching the consumer's expectations in term of taste, sensation in the mouth and appearance. In particular, many known functional ingredients have no particular flavor or even off-flavor that make the product carrying the functional ingredient(s) unpleasant to consume.

Therefore, it has been realized that at least part of the commercial success of a wellbeing oriented product is a question of how the product releases in the mouth. The consumer must have the sensation that something remarkable and perceivable appears in the mouth that send him signals that a functional activity takes place and preferably in a pleasant and tasteful manner. The present invention now provides products that meet these requirements.

SUMMARY OF THE INVENTION

The present invention relates to a genuine confectionery product that provides a perceivable sensory effect in the mouth as an indicative signal of the delivery of one or more functional ingredient(s) thereto. This confectionery product confers a sudden rapid and perceivable release in the mouth of a confectionery material without necessarily having to chew or bite the confectionery product. This creates or induces an effect of well-being in consumers of such products.

The invention also increases consumer acceptance of various functional confectionery products. This is done by offering alternative carriers in confectionery products for delivering the functional ingredient(s) depending upon how fast the functional ingredient(s) needs to be orally delivered. The invention provides the possibility of delivering functional ingredients at different speeds in the mouth, for example, either to confer a sustained release effect or to separate the delivery time of functional ingredients having different active effects, sensations and/or flavors.

Accordingly, the present invention provides a confectionery product that includes at least one functional ingredient. The product has a casing and a filling enclosed within the casing wherein the filling comprises at least one confectionery material having properties that confer to the filling a perceivable effect when the filling is released in the mouth. The casing is capable of forming a release means that upon the action of the saliva in the mouth acts to liberate the filling out of the casing. Furthermore, the confectionery material has dissolution properties effective to act together with the release means to enable the casing to be left substantially as an empty shell before it has entirely dissolved in the mouth.

Therefore, the confectionery product has the remarkable ability to provide the release of the filling in a perceivable manner upon the action of the saliva which dissolves in the mouth while the casing has not entirely melted.

In another embodiment, the invention relates to a functional confectionery product which comprises:

at least one functional ingredient for providing a functional benefit to a consumer;

a filling which includes at least one sensory agent having properties that confer to the filling a perceivable sensory effect in the mouth indicative of functional release; and a casing enclosing the filling and which dissolves slower than the filling, the casing further having release means activated by saliva for releasing the filling from the casing.

The invention also relates to a method for improving consumer acceptance of a confectionery product that contains a functional ingredient. The method comprises incorporating into the confectionery product a sensory agent producing a perceivable sensory effect in the consumer's mouth that is indicative of functional release.

The invention further relates to a method for inducing the effect or feeling of well being in a consumer. This method comprises administering to the consumer a confectionery product which contains a functional ingredient and a sensory agent which produces a perceivable sensory effect in the consumer's mouth that is indicative of functional release.

BRIEF DESCRIPTION OF THE DRAWING FIGURES

The invention will now be described in greater details in the following description.

DETAILED DESCRIPTION OF THE PREFERRED EMBODIMENTS

Figure 1:
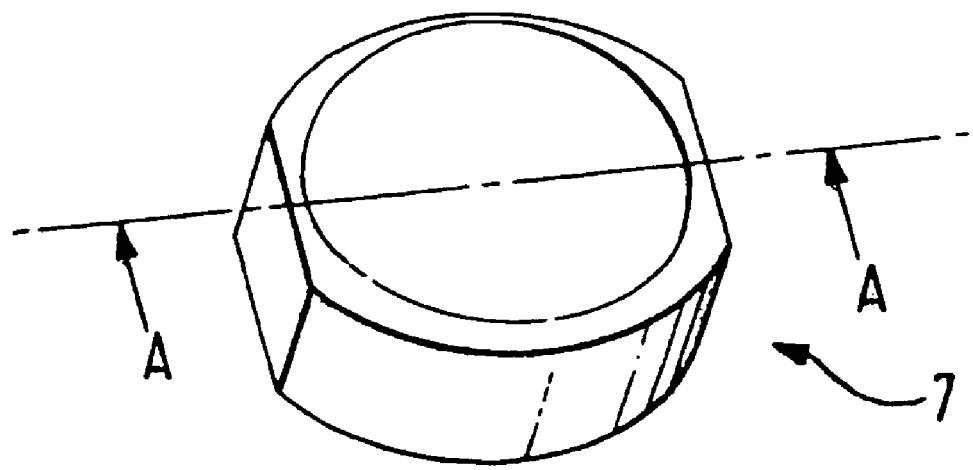
FIG. 1 is a perspective view of a filled sweet according to the invention.

The present invention provides a novel confectionery product that provides a perceivable sensory effect in the mouth as an indicative signal of the release of one or more functional ingredients. This increases the consumer's belief of functionality and improves the consumer's feeling and state of well-being. To do this, the invention preferably comprises a casing and a filling where the filling includes the confectionery sensory agent.

Preferably, the filling of the confectionery product comprises at least one confectionery carrier or sensory agent that has the capability to flow out of the casing while conferring a remarkable effect in the mouth that will make the filling clearly perceivable upon release in the mouth. In a preferred embodiment, the confectionery carrier is a powdered anhydrous mass having high dissolution properties giving the filling the ability to flow out of the casing through passage means in the casing formed upon contact of the product with saliva with rapid dissolution in the mouth.

Even more preferably, the carrier is selected from the group of polyols having both a cooling and "liquid" effect in the mouth provided by a high dissolution enthalpy. Indeed, it has been surprisingly found that when a crystalline powdered carrier in the form of such a polyol is released from the casing by the passage means, one may obtain a higher dissolution ratio of the filling in the mouth with both a "liquid" and cooling effect. This rapid dissolution positively affects the way the filling leaves the casing. This feeling of having a "liquid" feeling provided by dissolution effect differentiates from the solid feeling usually provided by compressed tablets or glassy sweets. This feeling also is differentiated from liquid feeling merely provided by liquid or viscous cores which release less rapidly and confer a syrupy feeling. The effect is also preserved by the fact the polyol is kept from a thermodynamic point of view, in a very stable and efficient state over time, as it may be efficiently protected from environment by the confectionery casing and especially from moisture ingress during the storage period.

A perceivable effect in the mouth is emphasized by the provision of release means that has the function of enabling the filling to rapidly and fully leave the casing thus giving a signal in a pleasant and tasteful way to the consumer that a filling is progressively liberated in the mouth before the casing has entirely melted. As a preferred embodiment, the release system comprises at least one small hole and/or zone of reduced thickness provided in the casing which is capable of forming at least one outside passage communicating with the filling. When zones of reduced thickness are provided in the casing, the passage means are formed after the confectionery product has been maintained in contact with the saliva during a few seconds. Preferably, the passage means is formed after a lag time of from 5 to 120 seconds, even preferably after a time of from 10 to 40 seconds to enable the release of the filling. The passage means is important to prevent a significant dissolution of the casing before the filling is released which otherwise would not confer the well-being effect that is sought indicative of functional activity for the consumer. To some extent, the passage means also reduces the consumer's desire to bite to the center of the product as the consumer can feel the progressive release of the filling. It is also believed that the passage means also participates to provide an improved consumer acceptance of the functional delivery.

Preferred polyols which may be used as a powder carrier are those which have a high negative heat of solution. The heat of solution is a thermodynamic expression to define the amount of heat a solution requires to dissolve one gram of solute. In the case of polyols having a perceivable cooling effect, energy is given off by the solution so as to make the heat of solution negative. The polyols of the invention have generally a heat of solution of less than −25 cal/g, preferably less than −30 cal/g. As a matter of comparison, sucrose is known as having a heat of solution of −4 cal/g only. When the filling is contacted by saliva in the mouth, a thermodynamic reaction between the anhydride polyol and the saliva occurs instantaneously and dissolution takes place thus conferring the impression that the powdered filling is a cool "liquid". It is also preferred that the solubility of a polyol for the filling be relatively high. More particularly, the solubility should preferably be higher than 240 g/100 g of water at 37° C. The higher the solubility, the more "liquid" the filling feels. However, the confectionery material for the filling should be soluble but not sufficiently hygroscopic as this would possibly cause formation of lumps in the casing which prevents the filling from leaving the casing upon the action of the saliva.

The confectionery material for the filling is preferably in a fluid powdered state within the casing; i.e., that is not in a self-cohesive solid, pasty or liquid state within the casing, thus giving the filling the ability to flow freely from the casing through a passage provided in through the casing. The fresh "liquid" effect is indeed also dependent on the flow properties of the powder when leaving the casing. The quicker a significant amount of the powder can discharge in the mouth, the greater an exploding fresh liquid effect is perceived, as the powder is immediately available to melt in contact with the saliva. The filling should not be agglomerated or pressed to make a self-cohesive mass within the casing, as the release of the filling would be delayed until the casing has almost entirely melted, thus conferring a more "solid" taste similar to the taste of crystallised polyol coatings.

A suitable monosaccharide polyol is preferably selected from the group consisting of xylitol, erythritol, sorbitol or a combination thereof. Xylitol is preferred due to testing and experiments that show that it is one of the polyols that tasted the most "liquid" and fresh, at the same time, upon release in mouth therefore giving an attractive perceivable effect in its function of releasing the functional ingredient(s). It also has a medium-range solubility which makes it both very reactive but also capable of sustaining an extensive period of storage within the casing of the invention without making lumps. Xylitol has a heat of solution of between −30 to −45 g/cal depending upon the chemical purity of the product (for instance, the commercial product Xylisorb® supplied by Roquette Frères of Lille, France is −34.8 g/cal). The solubility of xylitol is about 250–260 g/100 g of water at 37° C. whereas sucrose has a solubility under 230 g/100 g and maltitol has a solubility of less than 205 g/100 g. Sorbitol has a higher hygroscopicity and a water solubility of about 330–340 g/100 g (37° C.) but a lower heat of solution in the range of −28 to −26 g/cal. Sorbitol is supposed to have a slightly higher cooling effect than xylitol which can be measured by the instant fall of temperature when a determined amount of powder is added to water. The measured cooling effect of sorbitol is about −22° C. whereas xylitol is about −20° C. (Instant fall of temperature when 150 g of powder are added to 50 ml of water at 37° C.). However, in practice, it has been noted that xylitol provides a sharper combined "liquid" and fresher sensation in the mouth than sorbitol. Anhydride crystals of Erythritol differ from other polyols in that they are less water soluble but have a very low negative heat of solution of about −42 to −45 g/cal which confers a relatively weaker "liquid" feeling but a still a cool sensation in the mouth.

The control of the granulometry of the powder has also proved to be important for enhancing the cooling effect as well as for speeding up the emptying of the casing through the passage means and the reaction of dissolution in the mouth. The finer the particles of powder, the more the release of the polyol mass tastes "liquid" with no gritty sensation in the mouth. Finer free flowing particles promote the surface of contact of the polyol substrate with liquid during release which consequently concentrates the heat exchanges in a much shorter period of time. More specifically, substantially at least 85% by weight, preferably at least 95%, even more preferably 100% of the particles have a size preferably less than 250 microns. More preferably, at least 30% by weight, preferably 40 wt %, of the particles have even less than 100 microns. A suitable example of particle size distribution is: less than 0.1 wt. % of more than 500 microns, less than 1.2 wt. % of between 500 to 250 microns, less than 48 wt. % of between 250 to 100 microns and the remainder of less than 100 microns.

The confectionery carrier or sensory agent may comprise ingredients selected to provide a sensory effect that is complementary to the functional ingredient. For example, if the functional ingredient is a stimulant such as caffeine, the sensory agent may contain effervescent substances (e.g., bicarbonate) to enhance the stimulation. Similarly, if the functional ingredient is a calming substance such as valerian, the sensory agent may contain soothing substances to enhance the calming effect of valerian.

The confectionery carrier in the filling consists essentially of an anhydride polyol as aforementioned. However, small amounts of other ingredients might be added to flavor and/or sweeten the filling or to overcome an off-taste of the pure functional ingredient(s) when necessary. In particular, natural or artificial flavoring agents may be used. Spray-dried and freeze-dried fruit juice such as lemon, orange, strawberry or others, may advantageously be added in an amount lower than 20% by weight, and preferably lower than 12% by weight of the filling. Acids, such as citric acid or maleic acid, may also be added in amount preferably in the range of 0.1 to 3% by weight of the carrier.

Preferably, the amount of the confectionery carrier in the filling should be effective to produce the sensory effect; e.g., both a "liquid" and cooling effect that is sought. Therefore, the content of non-polyol components in the filling should not exceed 50% by weight of the filling. Therefore, the amount of polyol with the intended cooling effect should be of at least 50%, preferably at least 70%, even more preferably at least 85% by weight of the filling; the rest being functional ingredient(s) and/or flavoring and/or other ingredient(s).

The invention also provides the possibility to use either the filling or the casing as a carrier for the functional ingredient(s) depending upon the particular needs. In particular, if it is required to rapidly deliver the functional ingredient(s) in the mouth; e.g., for clinical, sensitive and/or flavor reasons, the filling is preferably the carrier for the functional ingredient(s). Alternatively, when there is a need for delaying the delivery of the functional ingredient and/or provide a sustained release of the functional ingredient(s), the casing may be the carrier for the functional ingredient(s). In another embodiment, when there is a need to deliver functional ingredient(s) at different speeds in the mouth, both the filling and the casing may serve the function of the carriers for the functional ingredient(s). In that particular case, both carriers may have the same functional ingredient(s) or alternatively both carriers may have different functional ingredients. For example, different functional ingredients may require to be stored separately in the confectionery and delivered at different dissolution rates to optimize their efficiency, prevent inhibitory effects and/or degradation, and/or offer improved sensations and/or flavors.

Within the context of this specification, the term "functional ingredient" refers more particularly to the ILSI European definition that states that a food can be regarded as "functional" if it is satisfactory demonstrated to affect beneficially one or more target functions in the body, beyond adequate nutritional effects in a way that is either an improved state of health and well-being and/or reduction of risk of disease (Scientific Concept Of Functional Foods In Europe: Consensus Document, British Journal Of Nutrition, Volume 80, supplement 1, August 1998). In particular, functional ingredients are nutritive substances that can be added to foods in controlled quantities in order to fulfill a specific physiological function or promote the health and well-being of the consumer. The functional ingredients may include ingredients having active effects in dental or medical hygiene, bone health, digestive aid, intestinal protection, general nutrition, performance nutrition, stress relief, throat soothers, breath fresheners, etc.

According to a preferred embodiment of the invention, the confectionery product includes at least one functional ingredient chosen among the list consisting of probiotic bacterium, prebiotic, vitamin, enzyme, antioxidant, mineral salt, amino-acid supplement, peptide, protein, gum, carbohydrate, phytochemical, dextrose, lecithin, other trace nutrient, brain-stimulating substance, energy provider, a mineral, mineral salt, botanical extract, fatty acid, oat beta glucan or other functional fibre, creatine, carnitine, bicarbonate, citrate, caffeine or any mixture thereof. The functional ingredient(s) may be enclosed within the filling and/or within the casing. Many functional ingredients are thermosensitive compounds such as the probiotics or vitamins that degrade upon heating them at temperatures higher than about 70–80° C. Depending upon the manufacturing method, the material for the casing may reach such temperatures levels or go even beyond them during the cooking stage. Therefore, the powdered carrier in the filling has been found to be an effective means for successfully insulating the functional ingredient(s) while keeping the functional ingredient(s) alive and/or active after encapsulation into the confectionery casing. Even more surprisingly, it has been found that polyols selected from the ones having a low heat of solution, such as xylitol, has the ability to protect the heat sensitive functional ingredients during the step of encasing with a melted material for the casing. In particular, tests have shown that heat sensitive functional ingredients, such as microorganisms, can be encased within the casing while the microorganisms can resist the heat encasing with no significant mortality.

Thermosensitive functional ingredients that may be used in the present invention typically include probiotic microorganisms in the form of live microbial feed supplement(s) which are recognised as conferring a beneficial effect for human beings. Probiotic microorganisms are micro-organisms which beneficially affect a host by improving its intestinal microbial balance (Fuller, R; 1989; J. Applied Bacteriology, 66: 365–378). There are a variety of probiotic microorganisms which are suitable, in particular, with regard to activation of the immune system, prevention of the bacterial overgrowth by pathogens, prevention of diarrhoea and/or restoration of intestinal flora. Probiotic microorganisms includes yeast such as *Bifidobacterium, Lactobacillus, Streptococcus,* or *Saccharomyces*. Preferably, the microorganism is in a spray dried or freeze-dried form.

More preferably, said probiotic bacterium may be selected from the group consisting of *Lactobacillus johnsonii, Lactobacillus paracasei, Bifidobacterium longum* B129, *Bifidobacterium longum* B128, *Bifidobacterium adolescentis* Bad4, and *Bifidobacterium lactis* Bb12. The strains were deposited by way of example under the Budapest Treaty at the Collection Nationale de Cultures de Microorganismes (CNCM), Institut Pasteur, 28 rue du Docteur Roux, 75724 Paris Cedex 15, France except for *Bifidobacterium lactis* Bb12.

*Lactobacillus johnsonii* (NCC 533) has been deposited on Jun. 30, 1992 under reference CNCM I-1225, *Lactobacillus paracasei* (NCC 2461) has been deposited on the Jan. 12, 1999 under reference CNMC I-2116, *Bifidobacterium longum* (B129) (NCC490) has been deposited on Mar. 15, 1999 under reference CNCM I-2170, *Bifidobacterium longum* (B128) (NCC481) has been deposited on Mar. 15, 1999 under reference CNCM I-2169, and *Bifidobacterium adolescentis* (Bad4) (NCC251) has been deposited on Mar. 15, 1999 under CNCM I-2168. *Bifidobacterium lactis* (Bb12) may be obtained at Hanzen A/S, 10–12 Boege Alle, P.O. Box 407, DK-2970.

The amount of probiotics may vary according to the specific needs. However, in a preferred embodiment, the amount of lactic acid bacterium in one piece of confectionery product is $10^2$ to $10^{12}$ count/gram, more preferably from $10^7$ to $10^{11}$ count/gram, and even more preferably $10^8$ to $10^{10}$ count/gram. The amount per gram of bacterium in one product is preferably determined upon the recommended daily dosage based on the number of products to be consumed per day.

Preferably, prebiotics may also advantageously be used alone or in combination with the probiotic bacteria in the confectionery product. Prebiotics comprise carbohydrates and more specifically oligosaccharides. Prebiotics of this kind have the ability to resist hydrolysis by enzymes of the human digestive tract, can reach the colon undegraded and provide a carbohydrate substance particularly suited to growth of probiotic bacteria. Oligosaccharides may be produced from glucose, galactose, xylose, maltose, sucrose, lactose, starch, xylan, hemicellulose, inulin, or a mixture thereof. Purified commercially available products such as fructooligosaccharide contain greater than about 95% solids in the form of oligosaccharides. In a preferred embodiment, the prebiotic comprises a mixture of fructooligosaccharide and inulin. Preferably this mixture comprises PREBIO1® or a mixture of commercially available RAFTILOSE® and RAFTILINE® commercialised by Orafti. A prebiotic of this kind has proved to improve the response of the immune system.

Other suitable functional ingredients comprise vitamins and minerals that the body is usually not capable of synthesising and which are necessary for ensuring normal growth and/or daily body maintenance. Both hydrosoluble or liposoluble vitamins may be used as functional ingredients in suitable amounts. The vitamins are preferably included in the filling as they usually are sensitive to light, oxygen and/or heat. A list of vitamins that may be used is not limiting and includes: Vitamin A (axerophtol or retinol), Vitamin D, Vitamin E (alpha-tocopherol), Vitamin K, Vitamin B and/or PP (niacin or nicotinic amid) and Vitamin C (L-ascorbic acid). The thermosensitivity of vitamins may vary in a wide range. For instance, vitamin B1 is highly thermosensitive whereas vitamin B3 (niacin) can resist very high temperatures without damage. Vitamins A, B2, B6 and C are also photosensitive and should therefore be included in the filling for a longer shelf stability. Vitamins A, B1, B6 and E are oxygen sensitive and therefore should also be included in the filling for a longer shelf stability. The dosage of vitamins in the confectionery may be adapted to the specific needs. Preferably, one product may contain a fraction of the recommended daily amount (RDA) of the desired functional ingredients. For instance, assuming a five sweets daily consumption, and following European RDA recommendations apply. Preferably, Vitamin A should be used as up to 160 µg and preferably between 70 µg and 90 µg in a single sweet; Vitamin C as up to 12 mg and preferably between 5 mg and 7 mg in a single sweet; Vitamin E as up to 2 mg and preferably between 0.8 mg and 1.2 mg in a single sweet; Vitamin D as up to 1 µg and is preferably between 0.4 µg and 0.6 µg in a single sweet; Vitamin B1 as up to 0.28 mg preferably between 0.12 mg and 0.15 mg in a single sweet.

Antioxidants can be used as the functional ingredient, alone or in combination with other functional ingredients, such as for example: glutathione, peroxidase, superoxide dismutase, catalase, co-enzyme Q10, honey, tocopherols, beta-carotene or other carotenoids, quertin, rutin, flavonoids, catechins anthocyanes, eleutorosids and ginsegnoids. Actually, a few of these antioxidants may be found in significant amounts in plant extracts. Examples are Ginko Biloba leaves which contains Ginko flavonoids, Blueberry fruits which contains anthocyanids, Ginseng roots which contains gingsengnoids, Eleuterococco roots which contains eleuterosids. The functional ingredient may also be a phytochemical chosen among the group consisting of polyphenol, procyanidin, phenolic acid, catechin or epicatechin, isoflavone, terpene or other phytonutritive plant material.

Preferably, suitable minerals as functional ingredients include macro-nutrients such as Sodium, Potassium, Calcium, Magnesium, Phosphorus or oligo-elements such as Iron, Zinc, Copper, Selenium, Chromium, Iodine. Macro-nutrients are known to play an essential role in complex metabolisms of the body such as in cellular cation exchange. A preferred macro-nutrient is calcium which is an essential constituent of the skeleton. Following EU RDA recommendations and assuming, for instance, an average daily consumption of 5 confectionery products, Calcium may be used in amounts of up to 160 mg, preferably between 60 mg and 90 mg a single product.

Trace elements are minerals present in the human body in quantity of usually less than 5 g. Zinc is a preferred mineral as its helps compensate for its increased losses during oxidative stress and because it has antioxidant properties and helps the synthesis of metallothionein. It is also an essential factor for protein synthesis and helps improve the function of the immune system. Following EU RDA recommendations and assuming a daily consumption of 5 confectionery products, Zinc may be used in amounts of up to 3 mg in the product, and preferably between 1.3 mg and 1.7 mg.

Selenium is also a preferred mineral for its antioxidant properties and is a co-factor for glutathione peroxidase. Selenium is also known to contribute to the integrity of muscles and sperm and also plays a role in hepatic metabolism. Selenium deficiencies may lead to severe cardiac, bone or neuro-muscular damage. Preferably, following the European RDA recommendations and assuming a daily consumption of 5 confectionery products: Selenium may be used in amounts of up to 11 µg per sweet, and preferably between 4 µg and 6 µg.

Preferably, active nutrients for the functional ingredient may include amino-acids, di-peptides or polypetides or proteins or essential fat acids. A suitable example of an amino-acid is glutamine which provides the advantage of providing fuel to gastro-intestinal and immune cells, reduces bacterial translocation and helps prevent muscle loss and improves nitrogen balance.

Preferred examples of peptides are the glycopetides of lactic origin active in inhibiting the adhesion of the bacteria responsible for dental plaque and caries. More particularly, dental and anti-plaque caries agents of these types comprise active principle(s) selected from kappa-caseino-glycopeptides and desialylated derivatives thereof (also known as "CGMP"). Such active principles are effective on dental plaque only after a few seconds in the mouth. Therefore, due its rapid release and dissolution rate, the filling is particularly suitable for serving as a carrier for these glycopeptides. A detailed description of these active glycopeptides is provided in U.S. Pat. No. 4,992,420, the content of which is expressly incorporated herein by reference thereto. Other peptides may also be a phosphopeptide or a salt thereof having anticaries properties such as those having from 5 to 30 amino acids including the sequence A-B-C-D-E where A, B, C, D and E are independently phosphoserine, phosphothreonine, phosphotyrosine, phosphohistidine, glutamate and aspartate and compositions particularly compositions to teeth including same. A detailed description of those phosphopeptides is provided in U.S. Pat. No. 5,015,628, the content of which is expressly incorporated herein by reference thereto.

Other examples of polypeptides are cysteine, acetylcysteine, cysteine methionine or mixtures thereof. In this regard, cystein and its derivatives are known to provide advantage of aiding defence oxidative stress and aid protein synthesis.

Other active nutrients include functional fibers or phospholipids.

Further examples of active chemicals are caffeine, a known CNS stimulant that is obtained as a by-product of coffee or tea extraction processes.

Preferably the functional ingredient may advantageously be taken from the category of botanical extract is selected from the group consisting of Guarana, Gingko Biloba, Kola nut, Goldenseal, Golo Kola, Schizandra, Elderberry, St. John's Wort, Valerian and Ephedra, beta-sitosterol, caffeine, cafestol, D-limonene, kabweol, nomilin, oltipraz, sulphoraphane, tangeretin, black tea, white tea, java tea, folic acid, garlic oil, fiber, green tea extract, lemon oil, mace, licorice, menthol, onion oil, orange oil, rosemary extract, milk thistle extract, Echinacea, Siberian ginseng or *Panax ginseng*, lemon balm, Kava Kava, matte, bilberry, soy, grapefruit, seaweed, hawthorn, lime blossom, sage, clove, basil, curcumin, taurine, wild oat herb, dandelion, gentian, aloe vera, hops, cinnamon, peppermint, grape, chamomile, fennel, marshmallow, ginger, slippery elm, cardamon, coriander, anise, thyme, rehmannia, eucalyptus, menthol, kava kava, schisandra, withania, cowslip, lycium, passion flower.

The functional ingredient may preferably be (micro) encapsulated in order to increase its stability and maintain its viability. (Micro)encapsulation means the incorporation of the functional ingredients in small (micro)capsules by various known techniques such as spray drying, spray chilling or spray cooling, extrusion coating, fluidized bed coating, liposome entrapment, coacervation, inclusion complexation, centrifugal extrusion and rotational suspension separation. The encapsulating material may be any one or more among the following list: fats, starches, dextrins, alginates, proteins, and lipids. The encapsulation of the functional ingredient(s) may also provide the advantage to delay the release of the functional ingredient and/or to gradually release the functional ingredient(s) along an extensive period of time in the digestives sites; i.e., the mouth and/or gut.

In a preferred aspect, the filling part should represent between 6 to 30% by weight of the whole confectionery product including the casing part, more preferably, 8 to 22% by weight, and even more preferably 11 to 18% by weight. The maximum amount of filling has proved to be a limiting factor for two main technical reasons. A first reason is due to the process difficulties that have been experienced for encasing the filling with a too high proportion of powder when using the conventional die forming method. If the casing is not sufficiently closed, the powder may leak out from the casing during storage thus causing a poor reactive effect upon consumption due to the lack of powder left in the casing. A second reason for a limited proportion of the filling is that the casing is also weakened with a too small thickness of the walls that might cause the fracture of the casing, in particular upon packaging of the product, if no very special attention is paid, that would lead to an increase of the rate of defective packaged products. On the other hand, if the amount of filling is too low, the casing will be too thick, the release will not form in contact with saliva and the perceivable effect; e.g., the liquid and refreshing effect, may be lost or at least seriously weakened. The casing may also be too firmly closed and the release of filling is delayed too much.

The filling may entirely or only partially fill the casing depending upon the size of the casing. For relatively small or medium size sweets, the casing is entirely filled with the filling so as to ensure both the desired liquid and functional effects. The casing has dimensions of usual sweets; i.e., a main weight ranging from 1 to 6 g, and preferably from 1.2 to 3 g.

In a preferred aspect of the invention, the casing of the confectionery is a boiled sweet, also commonly called hard sweet or high boiled candy which is a solid, glassy and amorphous casing. The casing may contain only sugar alcohols. In that case, the confectionery is thus entirely sugar-free, non-cariogenic and low calorie which also makes it suitable for children, elderly people, diabetic or in dental hygiene or breath freshness. The sugar alcohols for the casing can be of any commercially available, economically satisfactory, sugar alcohols which are suitable for the production of non-hygroscopic hard candy. The polyalcohols for the casing are preferably selected from the group consisting of isomalt, sorbitol, maltitol, lactitol, mannitol, polydextrose and combination thereof.

Besides the polyalcohols, carbohydrates such as sucrose and hydrogenated glucose syrup or other sugars can also be used in mixture with or in replacement to polyalcohols to make the casing. For instance, the casing may have a carbohydrate composition which is less sticky and has a lower tendency to loose its glassy appearance as described in U.S. Pat. No. 5,601,866 for which reference is made herein. Relevant additives such as natural or artificial flavorants, colorants or other active ingredients such as acids or sweeteners can be added in conventional amounts to the composition of the casing.

The final moisture content of the high boiled casing is preferably less than 3% by weight, preferably of about 2% by weight so as to confer an extended shelf life of the product and efficiently keep the filling dry and reagent.

As already mentioned, the casing should have a sufficient thickness to withstand manipulation and packaging operations without easily breaking or fracturing which would cause loss of powder and consequently would impart no or reduced perceivable effects such as the cooling effect of the xylitol carrier. Preferably, the thickness of the casing is comprised between 1 to 4 mm, and more preferably 1.5 to 2.5 mm. The casing may be formed of one or several layers of different hardness, texture and/or flavors. For instance, it may comprise a hard thin coating covering a softer inner layer.

As "casing", we mean any structure of shell provided at a macroscopic scale (at least one millimeter long) within which a significant amount of filling can be stored. Therefore, the casing may have various shapes such as spherical, ovoid, tubular or annular shapes.

The invention is now illustrated as preferred non-restrictive examples in connection with the appended drawings.

High boiled casings of the invention can be obtained by extensive dehydration of a slurry. Generally, the slurry is made of an aqueous mixture of saccharides and/or polyhydric alcohols which is boiled in suitable proportions in a cooker at a temperature of 130–150° C., preferably under vacuum conditions, to reach a high final solids content of less than 2.5%, preferably of about 1%. Heat resistant functional ingredients may be added at this stage. For instance, essential oils such as Thyme oil or Propoli may be added as part of the ingredients of the casing without suffering deterioration. After cooking, the cooked mass is poured onto a cold slab to reach a suitable plastic consistency.

Figure 3:
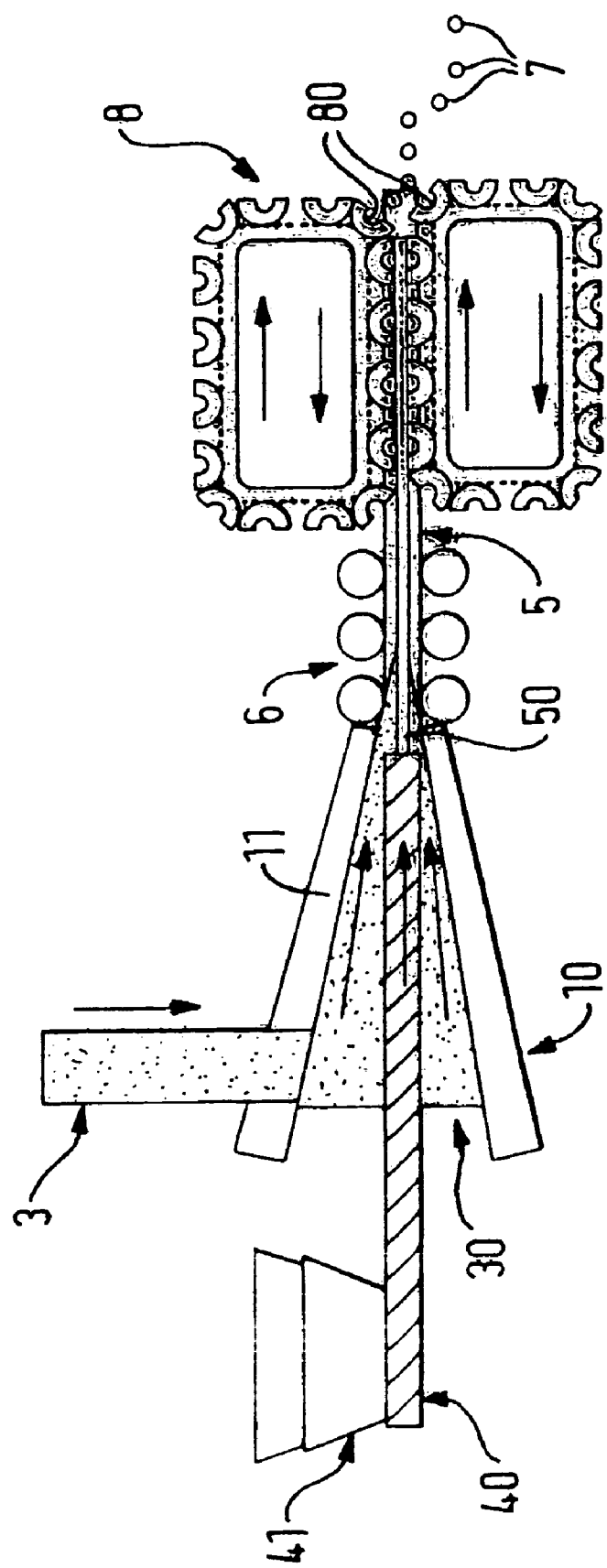
FIG. 3 illustrates a preferred process for producing the filled sweet that is shown in FIGS. 1 and 2.

As shown in FIG. 3, the cooked plastic mass 3 is conveyed to a batch roller 10 in which a cone 30 of the plastic mass is pulled out. The batch roller includes a number of conical rollers 11 depending on the manufacturer's specifications which have the function of forming a continuous rope of plastic mass at the end. A center filling pipe 40 is positioned in the cone of confectionery and the center filling comprising metered amounts of polyol carrier and functional ingredient(s) is forced by along the pipe which extends into about two thirds to 90% of the cone's length. For example, a Batch Former model 7RL with file pipe is commercialized by Nuova Euromec that leaves the batch roller contains the filling 50 of polyol crystal powder and functional ingredient(s).

The powder for the filling comes from an auger 41 to feed the center pipe 40. The next stage consists in sizing the rope 5 to the desired cross-section by using a rope sizer 6 such as a Ropesizer model 61FL from Nuova Euromec, Machinery Divison, 24057 Martinengo (Bg), Italy. Individual confectionery products 7 are cut and shaped from the sized filled rope in a die-forming device 8 such as a chain die like assembly having a high output rate (such as model 52STV from Nuova Euromec). The chain die assembly 8 comprises pairs of half-die members 80 that assemble during the rotation of the chains and punch the filled rope into the individual desired closed shapes. The cut ends of the filled sweet are thus closed or partially closed by punching.

As aforementioned, the proportion of filling should preferably not exceed 30% by weight, preferably 22%, even preferably 18% by weight, to limit serious closure problems that would lead to accidental leakage of the filling during storage or cause fragility of the casing. A preferred amount for the filling is of from 12 to 15% by weight of the confectionery product.

According to the method, at least one zone of reduced thickness and/or even one small hole is produced within the casing to enable the filling to discharge in mouth. Such zone(s) of reduction and/or hole (s) should be capable of forming at least one passage in the casing communicating with the filling of a size effective to allow at least a significant part of the filling to be rapidly freed into the mouth. The zone(s) of reduction may be flattened slits obtained by die pressing of the confectionery rope. The resulting passage(s) may be formed after a certain time lag between the introduction of the product in the mouth and the beginning of the release of the filling. The time lag is of from 5 to 120 seconds, more preferably from 10 to 40 seconds depending upon the initial thickness reduction, melting properties of the confectionery material of the casing, etc. Depending upon the size of the passages, the release of the filling is more or less progressive. The passages have also a tendency to progressively enlarge thus speeding up the release of filling in the mouth. As the filling continuously contacts the saliva, the dissolution is almost instantaneous. The filling is usually entirely released leaving an empty shell for the casing after the product has been maintained in the mouth for about 30 to 150 seconds, and preferably for 30 to 60 seconds.

Figure 2:
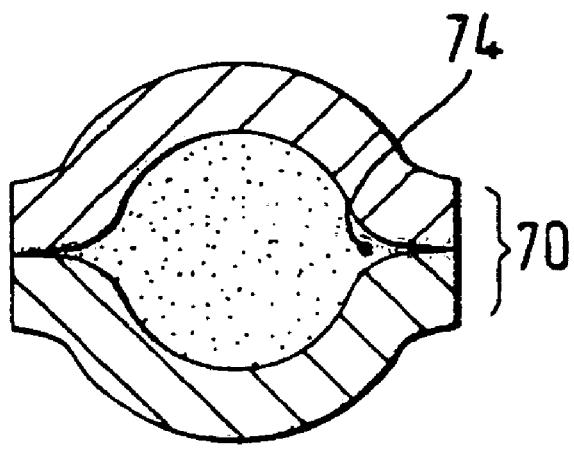
FIG. 2 is a cross sectional view of the sweet of FIG. 1 taken along line A—A.
Figure 4:
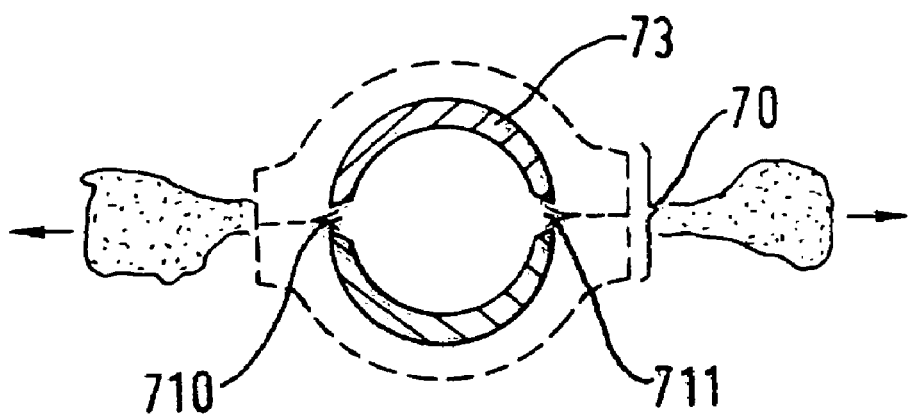
FIG. 4 is a cross-sectional view of the sweet of FIG. 1 after partial melting of the casing in the mouth to produce a rapid release of the filling.

FIG. 3 shows zones of reduced thickness 70 as a result of the punching action on the filled rope. As illustrated in FIG. 4, zones of reduced thickness 70 of the casing 73 form weaker zones that solubilize by saliva and before the entire casing 73 has entirely solubilized. Preferably, the reduced thickness ranges of from 0.8 to 0.01 times, preferably 0.5 to 0.05 times the average thickness of the casing. Therefore, in both cases larger passages 710, 711 are left after a few seconds in mouth which finally allow the filling to be freed before the rest of the casing has significantly melted. As a result of this progressive but rapid release of filling including the polyol and active ingredient(s), a very pleasant sensation of cool "liquid" is given off. The remainder of the casing is left as an empty shell capable of providing a sustained release for a functional ingredient. It is important to note that particular tapered shape 74 of the reduced thickness zones at the interface of the two-halves of the casing (FIG. 2). Such a tapered shape of the interior of the casing in this region gives rise to the passages or openings upon sufficient melting of the casing wall.

Figure 5:
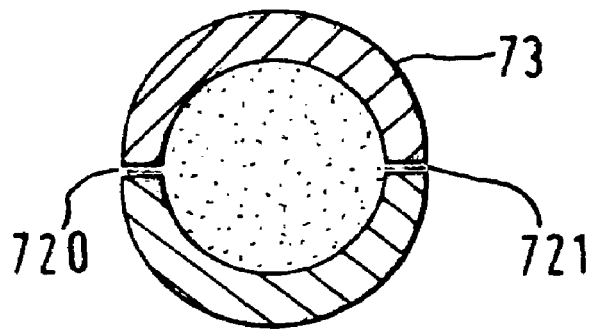
FIG. 5 is a cross-sectional view of a sweet according to a variant of the invention.

FIG. 5 illustrates a confectionery product with small holes 720, 721 opposite each other which are formed within the casing 73. The holes are produced during the die shaping of the casing by providing an appropriate clearance within die parts. The holes are produced during the compression of the forming of the confectionery casing in the chain die unit mainly because of the powder filling which does not allow the cooked mass to close the casing. The size of the holes can be linked to the amount of filling added in the sweet, the more filling the bigger the holes. With a lower filling level the holes can be almost completely closed. Therefore, the hole size may be controlled among other factors by adjusting the amount of powder within the casing. The holes should be of a size adapted to the granulometry of the powder for not allowing significant leakage of the powder in the conditions of storage while still releasing properly upon short contact with saliva. Small holes are holes equal to or less than 250 microns, and preferably equal to or less than 100 microns, within the casing thereby providing to the consumer a genuine impression of active release in the mouth.

Figure 6:
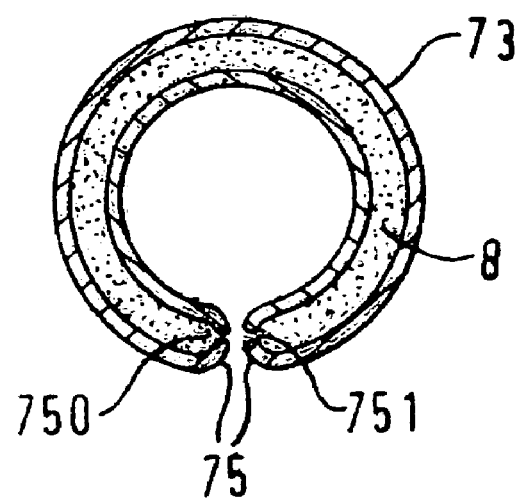
FIG. 6 is a cross-sectional view of a sweet according to another variant of the invention in which the casing has a tubular and substantially annular shape.

FIG. 6 illustrates a variant in which the casing 73 is obtained from a portion of tube and filled with the filling 8. The tube is shaped so as form a filled ring while leaving two free ends 75 with two small holes 750, 751.

The shape of the confectionery product is not strictly limited. The product could be shaped into round, square, polygonal forms or elongated bars without departing from the spirit of the invention.

In a possible alternative, the casing may be formed of a chewy crystallised structure known in the confectionery art as "low boiled" candy such as a fudge, a caramel or toffee. The method for producing the sweets is similar to the method for high boiled candy although the cooking conditions may slightly vary. A paste is to produce a crystallised or non-crystallised high-solids fluid that can be sized into a rope, filled and shaped by means of a die or chain die assembly.

In another variant, the casing may be made of a chewing gum material. Basically, the chewable gum includes a plasticized rubber or polymer, gum base texturizers and sugar and/or bulk sweeteners such as sorbitol, mannitol, hydrogenated starch hydrolyzates, isomalt and xylitol or any suitable polyalcohols. Flavors can be added to give a taste to the chewable casing which can be compounded to essential oils as it is known in the chewing gum industry. Fruit acids may also be added to the casing composition such as orange, lemon, mint, strawberry or grape to enhance the flavor effect of the casing. High intensity sweeteners can be used to increase the sweet taste such as acesulfame K, aspartame, thaumatin, glycyrrhin or saccharin. The chewing gum casing may be pan coated with sugar or sugar alcohols to confer a superficial rigid coating.

The rubber or polymer of the chewing gum may contain synthetic elastomers and/or natural elastomers. Synthetic elastomers may include, but are not limited to, polyisobutylene, isobutylene-isoprene copolymer, polyethylene vinyl acetate, polyisoprene, polyethylene, vinyl acetate-vinyl laurate copolymer or a combination thereof. Natural elastomers may include natural rubber such as latex and guayule, natural gums such as jelutong, lechi caspi, perillo, sorva, balata, etc. The preferred synthetic elastomer and natural elastomer proportions vary depending on whether the chewing gum is a conventional gum or a bubble gum. Plasticizers may include ester gums, for example, or other suitable plasticizers that are well known in the chewing gum industry.

Texturizers may include magnesium and calcium carbonate, ground limestone, silicate, clay, alumina, talc, titanium oxide, phosphates, cellulose polymers, or a combination thereof.

Non-limiting examples are described below with percentages given by weight, unless otherwise indicated.

EXAMPLES

The following examples further illustrate the present invention.

Example 1

A mixture of 80 Kg of isomalt F, 10 Kg of maltitol syrup and 10 Kg of water is cooked under 60% vacuum until reaching a cooking temperature of 155° C. The resulting cooked mass is flavored, colored and acidified and cooled down at 70° C. A batch roller equipped with a powder pump is charged with the cooked mass. Xylitol powder having particle size of less than 250 microns (XYLISORB® 90 grade from Roquette, France) and freeze-dried *lactobacillus Johnsonii* are mixed together and charged into the reservoir of the pump. The probiotic xylitol filling is prepared in the proportion of 100 grams of probiotic culture (at $10^{11}$ count/g) for 100 Kg of xylitol.

The xylitol and probiotic filling is then pumped into the cooked mass and the sweets are stamped in the chain die equipment. The filling is pumped to reach an amount of about 10 wt % of the total weight of the finished product.

The initial counting of the probiotic is of $2.10^8$ count per gram before incorporating the filling within the casing. A final counting is carried out after the manufacture which gives $7.10^7$ count/g thus showing a minor decay of the initial counting.

Example 2

The following example has an effect in the reinforcement of the cellular repair and sustainability of the body vitality. A mixture of 80 Kg of isomalt F, 10 Kg of maltitol syrup and 10 Kg of water is cooked under 60% vacuum until reaching the cooking temperature of 155° C. The cooked mass is flavored, colored and acidified and cooled down to 70° C. The mass is charged into the batch roller. Separately, a mixture of xylitol and vitamins powder is prepared according to the following composition: xylitol 98,279 wt %, citric acid 1,5 wt %, vit. B1 0,002 wt %, vit. B2 0,003 wt %, vit. B6 0,006 wt %, coloring 0.2 wt %, favoring 0,01 wt % and charged into the pump. The powder filling is pumped at about 10 wt % of the overall weight.

Example 3

The present example is a confectionery product having antioxidant properties with a repairing effect on cellular damages. The same cooked mass for the casing is produced according to example 1 and 2. A xylitol and vitamins power is prepared with the following mixture: xylitol 98,285 wt %, citric acid 1 wt %, sodium ascorbate 0,3 wt %, vit. E 0,025 wt %, green tea extract 0,180 wt %, flavoring 0,2 wt %, coloring 0,01 wt %. The powder filling is pumped at about 10 wt % of the overall weight.

Example 4

The present example is a confectionery product having anticaries properties and activity on remineralization of enamel of teeth. The same cooked mass for the casing is produced according to example 1 to 3. A xylitol powder and CGMP is prepared with the following mixture: xylitol powder 55.5 wt %, CGMP 42 wt %, mint flavor 2.5 wt %. The powder filling is pumped at about 12 wt % of the overall weight.

Example 5

The present example is a confectionery product having activity on body recalcification. The same cooked mass for the casing is produced according to example 1 to 4. A xylitol powder and calcium is prepared with the following mixture: xylitol powder 68.42%, Calcium (fraction obtained from milk) 13.3%, sodium bicarbonate 8.32%, citric acid 6.36%, malic acid 2%, flavor 1.6%. The powder filling is pumped at about 12 wt % of the overall weight.

Example 6

Comparative Dissolution Test

A sweet of the invention and a liquid filled sweet of exactly the same dimensions were submitted to a comparative dissolution test as follows. The sweets were produced with the same cooking parameters and the same sugar recipe for the casing but had a different filling; i.e., a xylitol powder filling in the sweet of the invention as compared to a liquid sugar filling in the case of the comparative sweet.

The casing for both sweets consisting of 50 wt % sucrose, 45 wt % glucose, 4 wt % water and 1 wt % citric acid was made in the manner described in the Example 1. The sweet of the invention had a filling of xylitol powder of average size of 90 microns. Comparatively, the filling of the comparative sweet was a liquid filling of a sugar composition and water in relative proportion sufficient to reach a measured value of refractometry of 84% Brix (similar to a liquid honey). The sugar composition of the liquid filling consisted of 50 wt % sucrose, 25 wt % glucose, 25 wt % invert sugar.

A panel of six trained persons was chosen to test the dissolution of the sweets in mouth. The panellists had to suck each sweet and respectively weigh each one every 15 seconds until the full dissolution of the sweets including the casing was completed. The dissolution test was repeated three times by each panelist. Each panellist used its "own sucking speed", the evaluation finished when the rest of the dissolved sample was impossible to be weighted. An average dissolution curve for each sample was established based on the overall results.

Figure 7:
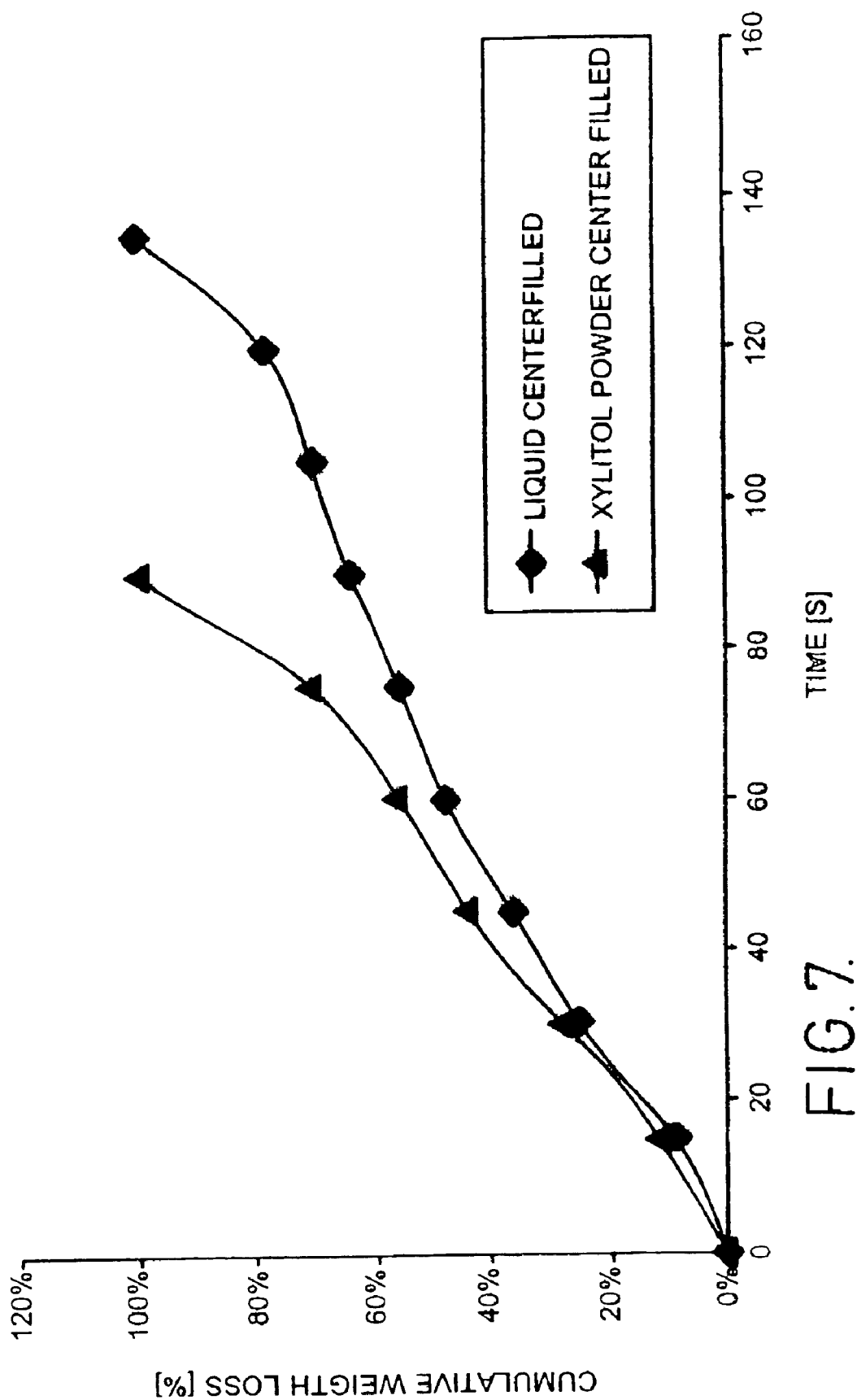
FIG. 7 is a graph of the profile of the cumulative weight loss over time according to the dissolution test of Example 4.

FIG. 7 represents the cumulative dissolution curves over time. It shows the final dissolution time corresponding to the highest point of the curves as well as the variation of the weight loss related to the time. As illustrated by the sharper slope of the curve, the sweet of the invention dissolved faster than the sweet comprising a liquid filling. The graph also shows that the sweet of the invention has entirely melted before the sweet of reference.

Figure 8:
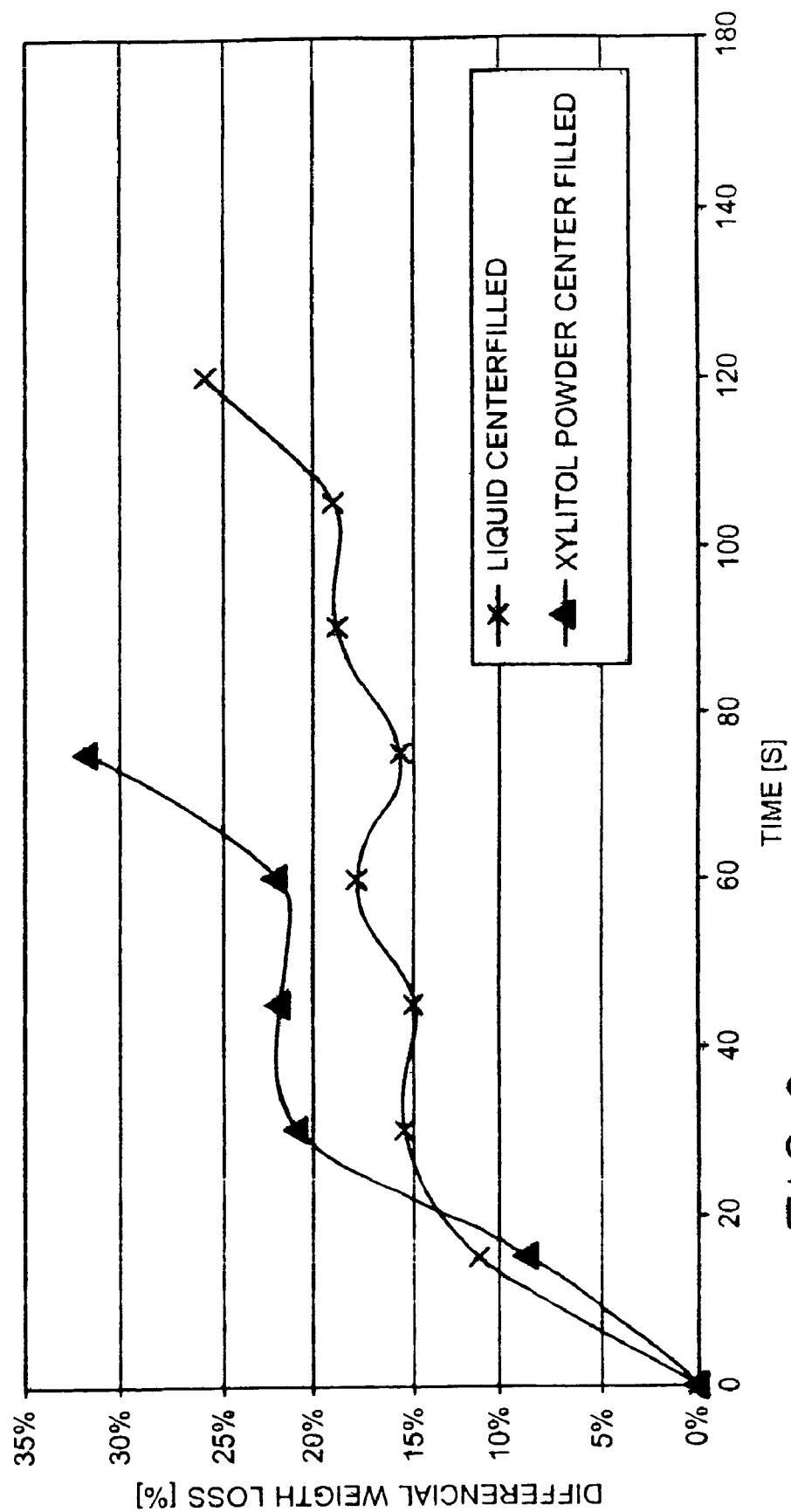
FIG. 8 is a graph of the profile of the differential weight loss over time also according to Example 4.

FIG. 8 represents the differential dissolution profile consisting of the weight variation related to the precedent weight which illustrates the dissolution speed in the mouth. During the first 20 seconds, the behavior of both sweets is substantially similar which corresponds to the initial melting of the casings. After 20 seconds, the passages in the casings have been made sufficient to leave it open for allowing a potential leakage of the filling in the mouth. Therefore, both the xylitol filling and the liquid filling are offered the possibility to release in the mouth. It is demonstrated in the part of the curve (between about 20–35 seconds) that the release of the xylitol filling is much faster than the release of the liquid filling. The xylitol filling has entirely left the casing after about 55 seconds (average time) leaving the casing as an empty shell. In the xylitol filled sweet, the dissolution rate is then stable until the holes diameter are big enough to allow the dissolving liquid; i.e., the saliva, to penetrate easily in the empty casing allowing the dissolution of the casing to carry on from the interior. It is remarkable to notice also that the dissolution rate speeds up again due to the introduction of the saliva within the casing as opposed to the sweet of reference where the dissolution rate is relatively steady and slow showing a simultaneous dissolution of the casing and liquid filling. As a sensory fact, it is noticed that the sweet of reference with the liquid filling confers a weak and slow liquid release more tasting like a pasty taste. It also does not confer any cooling effect. Also, the casing of the sweet of reference has almost entirely dissolved making small discrete pieces before the liquid center in the mouth has entirely dissolved. As a matter of comparison, the xylitol filling is liberated and dissolved rapidly in the mouth giving a fine liquid and fresh sensation. When keeping the product in the mouth without chewing, it is surprising to feel the casing empty of the filling while the saliva passing through the enlarged passages.

Example 7

Consumer Acceptance and Well Being Test

A comparative confidential test is conducted with two panels of 12 untrained consumers. All panellists are healthy. The consumers are asked to compare the confectionery products of example 2 and 3 to comparative examples which are identical except that the carrier for the functional ingredients comprises a mixture of sucrose, glucose syrup, flavorings and colorings.

In one session, the confectionery products are fed to one group of panellists blind and in random order. The panellists are requested to rate the confectionery products in terms of pleasantness and in terms of perceived effectiveness. A large majority of the panellist finds the confectionery products of example 2 and 3 to be significantly more acceptable and pleasant. All panellists identify the products of examples 2 and 3 as products that confer a more perceivable feeling of a release of functional material in the mouth.

In a second session, the second group of panellist is split into two equal sub-groups. One sub-group is given the confectionery products of example 2. The other sub-group is given the equivalent comparative confectionery product. Both sub-groups are informed of the functional activity. The panellists are asked to use the confectionery products according to the RDA recommendations over a period of 30 days. After 30 days, the panellists are interviewed to determine their general well being and feelings of health. The panellists consuming the confectionery products of example 2 express a better overall feelings of health and well being. These panellists prefer the confectionery products than those of the other sub-panel.

What is claimed is:

1. A confectionery product which comprises at least one functional ingredient said product having a casing and a filling enclosed within the casing, wherein the filling comprises at least one confectionery material having properties that confer to the filling a perceivable effect when the filling is released in the mouth, wherein the casing is capable of forming release means upon the action of the saliva in the mouth of a consumer, which acts to liberate the filling out of the casing, and wherein the confectionery material has dissolution properties effective to act together with the release means so as to enable the casing to be left substantially as an empty shell before it has entirely dissolved in the mouth.

2. The confectionery product according to claim 1, wherein the confectionery material of the filling is in a powdered anhydrous form.

3. The confectionery product according to claim 2, wherein the confectionery material of the filling is chosen so as to confer an instantaneous liquid and cooling effect when released in the mouth.

4. The confectionery product according to claim 1, wherein at least 85% by weight of particles of confectionery material have a size that is less than 250 microns.

5. The confectionery product according to claim 1, wherein the release means comprises at least one hole and/or zone of reduced thickness provided in the casing which is capable of eventually forming at least one outside passage communicating with the filling.

6. The confectionery product according to claim 5, wherein the at least one hole is equal to or less than 250 microns.

7. The confectionery product according to claim 5, wherein the filling represents between 6 to 30% by weight of the confectionery product.

8. The confectionery product according to claim 1, wherein the confectionery material of the filling comprises a polyol having a heat of solution of less than −25 cal/g.

9. The confectionery product according to claim 8, wherein the polyol is selected from the group consisting of xylitol, erythritol, sorbitol and combinations thereof.

10. The confectionery product according to claim 1, wherein the filling is entirely released leaving an empty shell for the casing after the product has been maintained in the mouth for about 30 to 150 seconds.

11. The confectionery product according to claim 1, wherein the filling is a carrier for the functional ingredient(s).

12. The confectionery product according to claim 1, wherein the casing is a carrier for the functional ingredient(s).

13. The confectionery product according to claim 1, wherein the filling and casing are carriers for different functional ingredient(s).

14. The confectionery product according to claim 1, wherein the functional ingredient is a probiotic bacterium, prebiotic, vitamin, enzyme, antioxidant, mineral salt, amino-acid supplement, peptide, protein, gum, carbohydrate, phytochemical, dextrose, lecithin, other trace nutrient, brain-stimulating substance, energy provider, a mineral, mineral salt, botanical extract, fatty acid, oat beta glucan or other functional fiber, creatine, carnitine, bicarbonate, citrate, caffeine or any mixture thereof.

15. The confectionery product according to claim 14, wherein the functional ingredient is a probiotic selected from the group consisting of *Bifidobacterium, Lactobacillus, Streptococcus*, and *Saccharomyces*.

16. The confectionery product according to claim 14, wherein the functional ingredient is a prebiotic comprising an oligosaceharide produced from glucose, galactose, xylose, maltose, sucrose, lactose, starch, xylan, hemicellulose, inulin or a mixture thereof.

17. The confectionery product according to claim 14, wherein the functional ingredient is a prebiotic comprising fructooligosaccharide and inulin.

18. The confectionery product according to claim 14, wherein the functional ingredient is a peptide comprising a glycopeptide or phosphopetide having anticaries action.

19. The confectionery product according to claim 14, wherein the functional ingredient is a vitamin comprising Vitamin A (axerophtol or retinol), Vitamin D, Vitamin E (alpha-tocopherol), Vitamin K, Vitamin B and/or PP (niacin or nicotinic amid) and Vitamin C (L-ascorbic acid) or combinations thereof.

20. The confectionery product according to claim 14, wherein the functional ingredient is a mineral comprising sodium, potassium, calcium, magnesium, phosphorus, iron, zinc, copper, selenium, chromium, iodine or combinations thereof.

21. The confectionery product according to claim 14, wherein the functional ingredient is a botanical extract selected from the group consisting of Guarana, Gingko Biloba, Kola nut, Goldenseal, Gob Kola, Schizandra, Elderberry, St. John's Wort, Valerian and Ephedra, beta-sitosterol, caffeine, cafestol, D-limonene, kabweol, nomilin, oltipraz, suiphoraphane, tangeretin, black tea, white tea, java tea, folic acid, garlic oil, fiber, green tea extract, lemon oil, mace, licorice, menthol, onion oil, orange oil, rosemary extract, milk thistle extract, Echinacea, Siberian ginseng or Panax ginseng, lemon balm, Kava Kava, matte, bilberry, soy, grapefruit, seaweed, hawthorn, lime blossom, sage, clove, basil, curcumin, taurine, wild oat herb, dandelion, gentian, aloe vera, hops, cinnamon, peppermint, grape, chamomile, fennel, marshmallow, ginger, slippery elm, cardamon, coriander, anise, thyme, rehmannia, eucalyptus, menthol, kava kava, schisandra, withania, cowslip, lycium, or passion flower.

22. The confectionery product according to claim 1, wherein the functional ingredient is (micro)encapsulated.

23. The confectionery product according to claim 1, wherein the casing has a hard glassy texture comprising saccharide or sugar alcohols.

24. The confectionery product according to claim 23, wherein the casing includes at least one sugar alcohol selected from the group consisting of isomalt, sorbitol, maltitol, mannitol, lactitol, polydextrose and combinations thereof.

25. The confectionery product according to claim 1, wherein the casing comprises a chewy confectionery material.

26. The confectionery product according to claim 1, wherein the filling is encased in the casing by sizing a filled rope within the casing and forming individual products by stamping the rope-filled casing in a die.

27. A functional confectionery product which comprises:
   at least one functional ingredient for providing a functional benefit to a consumer;
   a filling which includes at least one sensory agent having properties that confer to the filling a perceivable sensory effect in the mouth indicative of functional release; and
   a casing enclosing the filling and which dissolves slower than the filling, the casing having release means activated by saliva for releasing the filling from the casing, and wherein the sensory agent has dissolution properties effective to act together with the release means so as to enable the casing to be left substantially as an empty shell before it has entirely dissolved in the mouth.

28. A method for improving consumer acceptance of a confectionery product containing a functional ingredient, a casing and a filling enclosed within the casing, the method comprising incorporating into the confectionery product a sensory agent producing a perceivable sensory effect in the consumer's mouth indicative of functional release, wherein the casing has release means activated by the saliva of a consumer for releasing the filling from the casing, and wherein the sensory agent has dissolution properties effective to act together with the release means so as to enable the casing to be left substantially as an empty shell before it has entirely dissolved in the mouth.

29. The method according to claim 28, wherein the sensory agent provides a liquid sensory effect obtained by rapid dissolution.

30. A method for inducing an effect of well being in a consumer, the method comprising administering to the consumer a confectionery product which contains a functional ingredient and a sensory agent which produces a perceivable sensory effect in the consumer's mouth indicative of functional release, wherein the confectionary product comprises a casing, wherein a filling enclosed within the casing, wherein the casing has release means activated by the saliva of a consumer for releasing the filling from the casing, and wherein the sensory agent has dissolution properties effective to act together with the release means so as to enable the casing to be left substantially as an empty shell before it has entirely dissolved in the consumer's mouth.

31. The method according to claim 30, wherein the sensory agent provides a liquid sensory effect obtained by rapid dissolution.

32. The method according to claim 30, wherein the sensory agent is provided by a filling of the confectionery product in powdered form.

33. The method according to claim 30 wherein the filling is encased by sizing a filled rope within a casing and forming individual products by stamping the rope-filled casing in a die.

* * * * *